United States Patent
Geng

(10) Patent No.: US 11,388,453 B2
(45) Date of Patent: Jul. 12, 2022

(54) METHOD FOR PROCESSING LIVE-STREAMING INTERACTION VIDEO AND SERVER

(71) Applicant: BEIJING DAJIA INTERNET INFORMATION TECHNOLOGY CO., LTD., Beijing (CN)

(72) Inventor: Zhenjian Geng, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/397,024

(22) Filed: Aug. 9, 2021

(65) Prior Publication Data

US 2022/0086509 A1     Mar. 17, 2022

(30) Foreign Application Priority Data

Sep. 14, 2020   (CN) ........................ 202010957853.X

(51) Int. Cl.
| | |
|---|---|
| H04N 21/20 | (2011.01) |
| H04N 21/40 | (2011.01) |
| H04N 21/60 | (2011.01) |
| H04N 21/2343 | (2011.01) |
| H04N 21/2187 | (2011.01) |
| H04N 21/4788 | (2011.01) |

(52) U.S. Cl.
CPC ..... *H04N 21/2343* (2013.01); *H04N 21/2187* (2013.01); *H04N 21/4788* (2013.01)

(58) Field of Classification Search
CPC .......... H04N 21/4788; H04N 21/2187; H04N 21/4312; H04N 21/2668; H04N 21/6405;
(Continued)

(56) References Cited

U.S. PATENT DOCUMENTS

2014/0337967 A1* 11/2014 Zhai .................... H04L 63/0272
                                                 726/15
2015/0244754 A1* 8/2015 Beckham, Jr. .......... H04L 65/60
                                                 709/219

(Continued)

FOREIGN PATENT DOCUMENTS

| CN | 106954100 A | 7/2017 |
| CN | 108495152 A | 9/2018 |

(Continued)

OTHER PUBLICATIONS

The State Intellectual Property Office of People's Republic of China, First Office Action in Application No. 202010957853.X, dated Nov. 3, 2020, which is a foreign counterpart application corresponding to this U.S. Patent Application, to which this application claims priority.

(Continued)

*Primary Examiner* — Alazar Tilahun
(74) *Attorney, Agent, or Firm* — Kolitch Romano LLP

(57) ABSTRACT

A method for processing a live-streaming interaction video comprises sending a data transmission request to a first anchor terminal and a second anchor terminal in response to a response message from the first anchor terminal; receiving first live-streaming data, first interaction information, second live-streaming data and second interaction information; acquiring target live-streaming data by fusing the first live-streaming data, the first interaction information, the second live-streaming data with the second interaction information; and sending the target live-streaming data to multiple audience terminals.

14 Claims, 8 Drawing Sheets

(58) Field of Classification Search
CPC .... H04N 7/147; H04N 7/152; H04L 65/1069; H04L 65/403; H04L 65/4038; H04L 65/4076; H04L 65/605
See application file for complete search history.

(56) References Cited

U.S. PATENT DOCUMENTS

2018/0041551 A1* 2/2018 Ormseth ............... H04L 51/04
2020/0162765 A1* 5/2020 Lv ................... H04N 21/25858

FOREIGN PATENT DOCUMENTS

| CN | 109525883 A | 3/2019 |
|---|---|---|
| CN | 108055552 B | 11/2019 |
| CN | 111246235 A | 6/2020 |
| CN | 111405304 A | 7/2020 |
| CN | 111432266 A | 7/2020 |

OTHER PUBLICATIONS

The State Intellectual Property Office of People's Republic of China, Second Office Action in Application No. 202010957853.X, dated Dec. 8, 2020, which is a foreign counterpart application corresponding to this U.S. Patent Application, to which this application claims priority.

The State Intellectual Property Office of People's Republic of China, Notification to Grant Patent Right for Invention in Application No. 202010957853.X, dated Jan. 1, 2021, which is a foreign counterpart application corresponding to this U.S. Patent Application, to which this application claims priority.

* cited by examiner

METHOD FOR PROCESSING LIVE-STREAMING INTERACTION VIDEO AND SERVER

This application is based on and claims priority to Chinese Patent Application No. 202010957853.X, filed on Sep. 14, 2020, the disclosure of which is herein incorporated by reference in its entirety.

TECHNICAL FIELD

The present disclosure relates to the field of internet technologies, and in particular to a method for processing a live-streaming interaction video and a server.

BACKGROUND

With development of the internet technology, more and more multimedia live streaming is presented to audiences, and co-hosting live streaming may also be performed between different anchors, so as to present diversified live-streaming interaction videos to the audiences.

SUMMARY

The present disclosure provides a method for processing a live-streaming interaction video and a server.

According to an aspect of embodiments of the present disclosure, a method for processing a live-streaming interaction video is provided. The method is executable by a server, and the method includes: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room, and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

According to another aspect of embodiments of the present disclosure, a method for processing a live-streaming interaction video is provided. The method is executable by an audience terminal, and the method includes: sending a live-streaming watching request to a server; wherein the live-streaming watching request is configured to instruct the server to acquire target live-streaming data and the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

According to another aspect of embodiments of the present disclosure, a server is provided. The server includes: a processor; and a memory configured to store at least one instruction executable by the processor, wherein the processor, when loading and executing the at least one instruction, is caused to perform: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

According to another aspect of embodiments of the present disclosure, an electronic device is provided. The electronic device includes: a processor; and a memory for storing at least one instruction executable by the processor, wherein the processor, when loading and executing the at least one instruction, is caused to perform: sending a live-streaming watching request to a server; wherein the live-streaming watching request is configured to instruct the server to acquire target live-streaming data and the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

According to another aspect of embodiments of the present disclosure, a storage medium is provided. The storage medium stores at least one instruction therein, wherein the at least one instruction, when loaded and executed by a processor of a server, causes the server to perform: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

According to another aspect of embodiments of the present disclosure, a storage medium is provided. The storage medium stores at least one instruction therein, wherein the at least one instruction, when loaded and executed by a processor of an electronic device, causes the electronic device to perform: sending a live-streaming watching request to a server; wherein the live-streaming watching request is configured to instruct the server to acquire target live-streaming data and the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

According to another aspect of embodiments of the present disclosure, a computer application product is provided. The computer program product stores at least one computer program stored in a readable-storage medium, wherein the at least one computer program, when read and executed by at least one processor of a device, causes the device to perform: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

According to another aspect of embodiments of the present disclosure, a computer application product is provided. The computer program product stores at least one computer program stored in a readable-storage medium, wherein the at least one computer program, when read and executed by at least one processor of a device, causes the device to perform: sending a live-streaming watching request to a server; wherein the live-streaming watching request is configured to instruct the server to acquire target live-streaming data and the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

DETAILED DESCRIPTION

Figure 1:
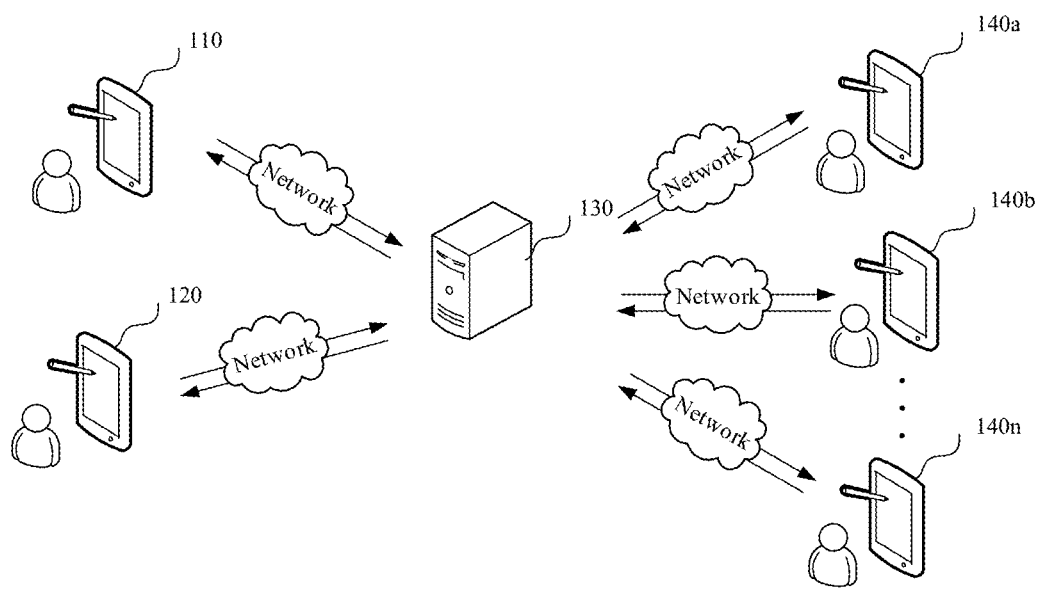
FIG. 1 is a schematic diagram of an application environment of a method for processing a live-streaming interaction video according to an embodiment of the present disclosure.

A method for processing a live-streaming interaction video according to the present disclosure may be applicable to an application environment as shown in FIG. 1. A first anchor terminal 110 and a second anchor terminal 120 interact and communicate with each other over a network and a server 130, and the server 130 is also connected to a plurality of audience terminals 140, such as an audience terminal 140a and an audience terminal 140b. The first anchor terminal 110 and the second anchor terminal 120 refer to electronic devices with screen recording and live streaming functions; the audience terminals 140 refer to electronic devices with live streaming watching functions, and these electronic devices may include but not limited to various personal computers, laptops, smart phones, tablet computers, and the like; the server 130 may be implemented by an independent server or a server cluster formed by a plurality of servers, such as co-hosting servers and live-streaming servers.

In a live-streaming interaction scenario as shown in FIG. 1, the server 130 sends a data transmission request to a first anchor terminal 110 and a second anchor terminal 120 in response to a response message from the first anchor terminal 110, wherein the response message is intended to response to an interaction connection request that is sent from the second anchor terminal 120; the server 130 receives first live-streaming data, first interaction information, second live-streaming data and second interaction information, wherein the first live-streaming data is live-streaming data corresponding to the first anchor terminal 110 during live-streaming in a first live-streaming room, the first interaction information is interaction information posted by a first audience account in the first live-streaming room, the second live-streaming data is live-streaming data corresponding to the second anchor terminal 120 during live-streaming in a second live-streaming room, and the second interaction information is interaction information posted by a second audience account in the second live-streaming room; the server 130 acquires target live-streaming data by fusing the first live-streaming data, the first interaction information, the second live-streaming data with the second interaction information; and the server 130 sends the target live-streaming data to multiple audience terminals 140, wherein the multiple audience terminals 140 include a terminal corresponding to the first audience account and a terminal corresponding to the second audience account. The multiple audience terminals 140 displays a live-streaming interaction video corresponding to the target live-streaming data and displays the first interaction information and the second interaction information on a terminal interface.

Figure 2:
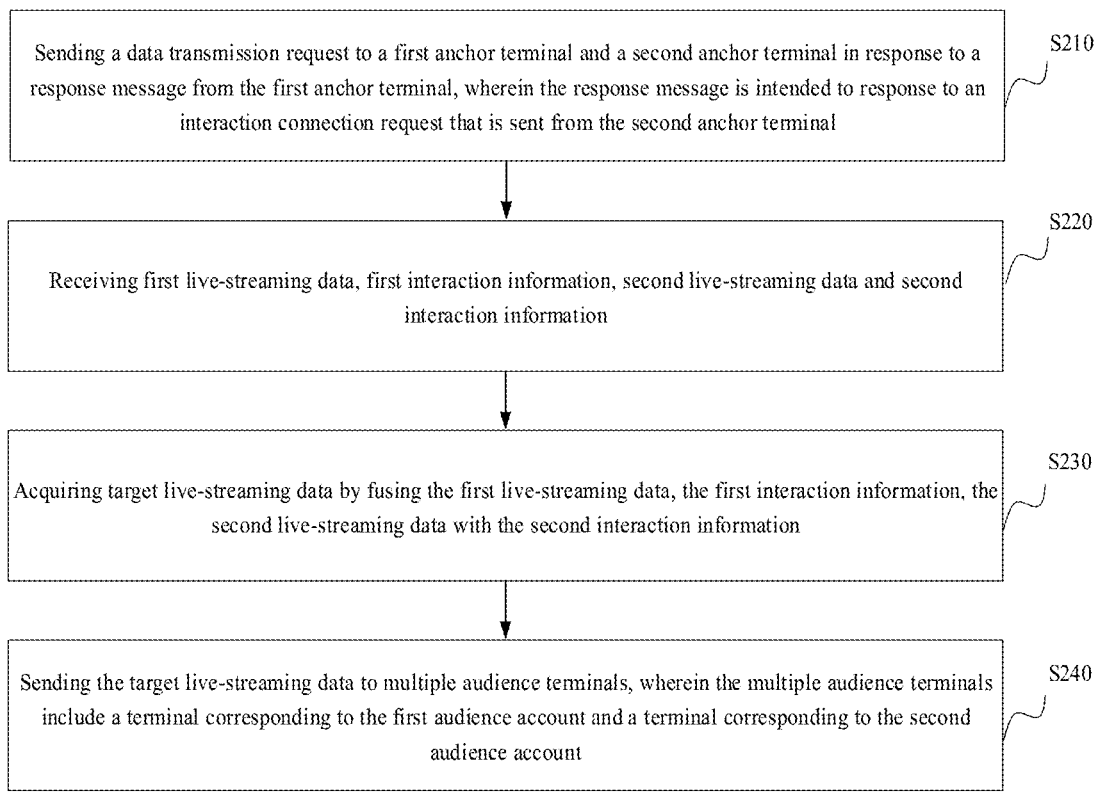
FIG. 2 is a flowchart of a method for processing a live-streaming interaction video according to an embodiment of the present disclosure.

FIG. 2 is a flowchart of a method for processing a live-streaming interaction video according to an embodiment of the present disclosure. As shown in FIG. 2, the method for processing a live-streaming interaction video is executable by the server shown in FIG. 1, and the method includes the following steps.

In S210, a data transmission request to a first anchor terminal and a second anchor terminal is sent in response to a response message from the first anchor terminal, wherein the response message is intended to respond an interaction connection request that is sent from the second anchor terminal.

In other words, the response message for an interaction connection request that is sent from a first anchor terminal to a second anchor terminal is received by the server.

The first anchor terminal and the second anchor terminal both refer to electronic devices corresponding to anchor accounts currently performing live streaming; the anchor account currently performing live streaming refers to an account of an anchor who currently performs live streaming, the anchor is equivalent to a host and may control various functions in a live streaming room. For example, the anchor may actively invite another anchor to co-host or approve or reject a co-hosting request from another anchor, or disconnect with a particular anchor. Co-hosting refers to that two anchors who currently perform live streaming enter a PK state through mutual negotiation or background matching; once entering the PK state, two anchors who originally perform live streaming alone may make a video call with each other; at the same time, a live streaming picture seen by the audience account logged in with the audience terminal on the terminal interface is divided into two pictures, that is, from an original live streaming picture of one anchor to two live streaming pictures of two anchors on the left and right. In a live streaming scenario, the interaction connection request refers to a co-hosting request, such as a voice connection request and a video connection request, and the response message for the interaction connection request refers to a response message for the co-hosting request.

In some embodiments, the server receives an interaction connection request that is sent from the second anchor terminal to the first anchor terminal, sends the interaction connection request to the first anchor terminal, detects a response message for the interaction connection request that is sent from the first anchor terminal to the second anchor terminal; and sends a notification message of successful interaction connection to the second anchor terminal if the response message for the interaction connection request that is sent from the first anchor terminal to the second anchor terminal is detected.

In some embodiments, when a second anchor account logged in with the second anchor terminal wants to initiate a co-hosting request to a first anchor account logged in with the first anchor terminal, the second anchor account may click an icon intended to initiate the co-hosting and displayed in an application page of the second anchor terminal, and select the first anchor account in a list of accounts currently performing live streaming, so as to generate a co-hosting request of the second anchor terminal to the first anchor terminal. Then the second anchor terminal send the co-hosting request to the server. The server acquires a receiving object (that is, the first anchor account) for the co-hosting request of the second anchor terminal by analyzing the received co-hosting request, and sends the co-hosting request to the first anchor terminal based on the first anchor account. If the first anchor account agrees with the co-hosting request of the second anchor account, an icon intended to agree with the co-hosting and displayed in an application page of the first anchor terminal is clicked, then the first anchor terminal generates the response message for the interaction connection request to the second anchor terminal and sends the response message to the server. The server determines two anchor terminals currently agreeing with the co-hosting based on the response message and sends a data transmission request to the first anchor terminal and the second anchor terminal, so as to facilitate subsequently receiving first live-streaming data transmitted by the first anchor terminal and second live-streaming data transmitted by the second anchor terminal. The first live-streaming data is live-streaming data corresponding to the first anchor terminal during live-streaming in a first live-streaming room and the second live-streaming data is live-streaming data corresponding to the second anchor terminal during live-streaming in a second live-streaming room. Where the first live-streaming room is also called a first virtual space, and the second live-streaming room is also called a second virtual space.

In S220, first live-streaming data, first interaction information, second live-streaming data and second interaction information are received.

Wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room, and the second interaction information is interaction information posted by a second audience account in the second live-streaming room.

In some embodiments, the server may receive the first live-streaming data and first interaction information transmitted by the first anchor terminal and receive second live-streaming data and second interaction information transmitted by the second anchor terminal over preset video stream transmission lines based on the response message.

The preset video stream transmission line refers to a dedicated video stream transmission line, for example, a private user datagram protocol (UDP) line; the first live-streaming room refers to a live streaming room in which the first anchor account currently performs live streaming, and the second live-streaming room refers to a living streaming room in which the second anchor account currently performs live streaming.

The first live-streaming data refers to streaming media data acquired by encoding and compressing audio data and video data from the first live-streaming room, the first audience account refers to an audience account in the first live-streaming room, and the first interaction information refers to comment information, gift-giving information, and the like posted by the first audience account in the first live-streaming room.

The second live-streaming data refers to streaming media data acquired by encoding and compressing audio data and video data from the second live-streaming room, the second audience account refers to an audience account in the second live-streaming room, and the second interaction information refers to comment information, gift-giving information, and the like posted by the second audience account in the second live-streaming room.

In some embodiments, the server determines, based on the response message, the first anchor terminal and the second anchor terminal which currently establish an interaction connection, and then sends the data transmission request to the first anchor terminal and the second anchor terminal over the preset video stream transmission lines, and receives the first live-streaming data and first interaction information transmitted by the first anchor terminal and the second live-streaming video stream and second interaction information transmitted by the second anchor terminal over the preset video stream transmission lines. In this way, the live-streaming data from the anchor terminal can be received over the preset video stream transmission line which is the dedicated video stream transmission line, thereby facilitating shortening transmission time of the live-streaming data and reducing delay of the live-streaming interaction video sent to the audience terminal.

For example, the server determines, based on the response message, the first anchor terminal and the second anchor terminal which currently establish co-hosting, and then sends a first signaling message to the first anchor terminal and a second signaling message to the second anchor terminal over private UDP lines, the first signaling message and the second signaling message is configured to request the first anchor terminal and the second terminal to transmit the corresponding live-streaming data and interaction information to the server over the private UDP lines. The first anchor terminal acquires audio data, video data and audience comment information from the first live-streaming room in response to the first signaling message; wherein the audience comment information from the first live-streaming room is taken as the first interaction information, and the first live-streaming data from the first live-streaming room is acquired by compressing and encoding the audio data and the video data from the first live-streaming room. The first anchor terminal further transmits the first live-streaming data and the first interaction information from the first live-streaming room to the server over the private UDP line without transmitting the first live-streaming data from the first live-streaming room to the second anchor terminal.

Similarly, the second anchor terminal acquires audio data, video data and audience comment information from the second live-streaming room in response to the second signaling message; wherein the audience comment information from the second live-streaming room is taken as the second interaction information, and the second live-streaming data from the second live-streaming room is acquired by compressing and encoding the audio data and the video data from the second live-streaming room. The second anchor terminal further transmits the second live-streaming data and the second interaction information from the second live-streaming room to the server over the private UDP line without transmitting the second live-streaming data from the second live-streaming room to the first anchor terminal or receiving the first live-streaming data from the first live-streaming room from the first anchor terminal.

In S230, target live-streaming data is acquired by fusing the first live-streaming data, the first interaction information, the second live-streaming data with the second interaction information.

Figure 3:
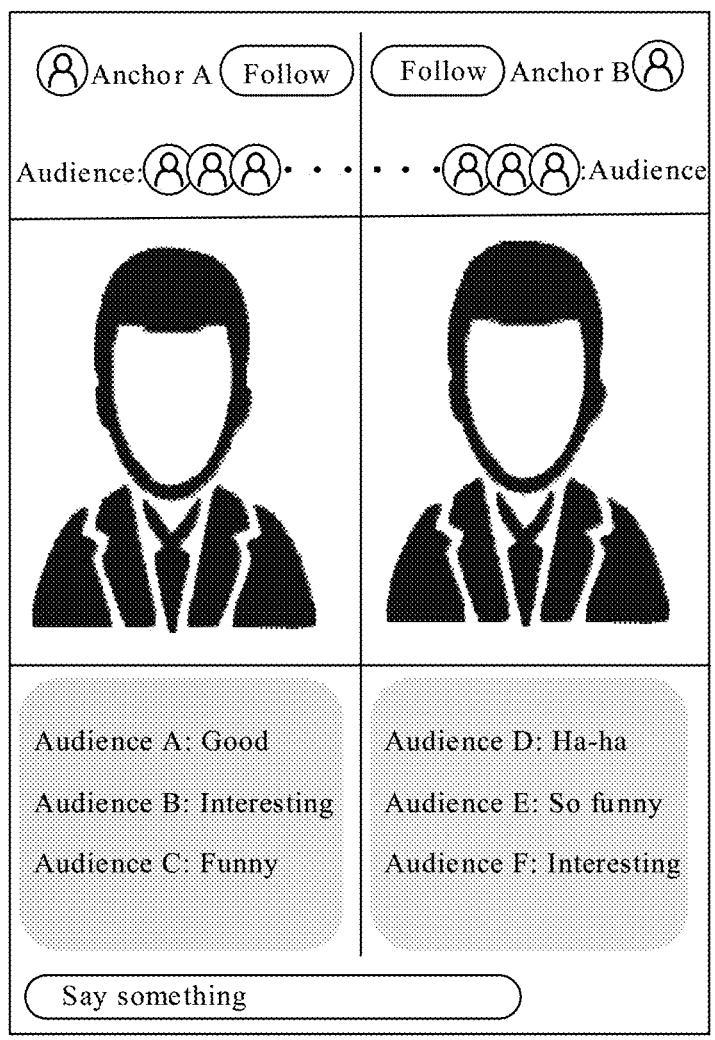
FIG. 3 is a schematic diagram of an interface of a target live-streaming room according to an embodiment of the present disclosure.

Fusion refers to that the first live-streaming data and the first interaction information from the first live-streaming room and the second live-streaming data and the second interaction information from the second live-streaming room are mixed, so as to display the mixed live-streaming data in a same live-streaming room. In this way, a live-streaming interface viewed on the audience terminal may be divided into left and right live-streaming room interfaces carrying live-streaming images of accounts logged in with the respective anchor terminals respectively, as shown in FIG. 3.

In some embodiments, the server may mix the first live-streaming data and the first interaction information from the first live-streaming room and the second live-streaming data and the second interaction information from the second live-streaming room, and take the mixed live-streaming data as the target live-streaming data. The live-streaming data and the interaction information from two live-streaming rooms are mixed by the server with good processing performance, so as to facilitate rapid synchronization and then transmission of the acquired target live-streaming data to the audience terminal. In the related art wherein the mixing of two live-streaming data are performed at the anchor terminal, there exist delayed transmission and thus delayed broadcast of the interaction video. The present disclosure avoids or reduces the delay of the live-streaming interaction video by processing/mixing the live-streaming data from different live-streaming rooms using a better performance server that has sufficient computing resource and the network bandwidth.

In S240, the target live-streaming data is sent to multiple audience terminals, wherein the multiple audience terminals include a terminal corresponding to the first audience account and a terminal corresponding to the second audience account As the first audience account is an audience account in the first live-streaming room, and the second audience account is an audience account in the second live-streaming room, an audience terminal is a terminal corresponding to an audience account in the first live-streaming room or in the second live-streaming room.

In some embodiments, the server sends the target live-streaming data to a content distribution network, and sends the target live-streaming data to the corresponding audience terminal over the content distribution network. In this way, when the first anchor account is co-hosted with the second anchor account, live-streaming room can synchronously play the live-streaming interaction video corresponding to the target live-streaming data, and display the first interaction information posted by the first audience account in the first live-streaming room and the second interaction information posted by the second audience account in the second live-streaming room. The content distribution network is configured to buffer, store and forward the live-streaming data and the interaction information uploaded by the anchor terminal and distribute the live-streaming data and the interaction information to the audience terminal.

For example, when an anchor account A is co-hosted with an anchor account B for PK, anchors and audiences in two live-streaming rooms are all transferred into a same new live-streaming room, and a picture of the live-streaming room is divided into two pictures for carrying the live-streaming images and audience comment information of two anchor user respectively, as shown in FIG. 3. In this way, the audiences may view both anchors in the live-streaming room, and may also view an effect that the audience comment information is scrolling from time to time.

In the above method for processing a live-streaming interaction video, a data transmission request is sent to a first anchor terminal and a second anchor terminal in response to a response message from the first anchor terminal, the server receives first live-streaming data and first interaction information transmitted by the first anchor terminal and second live-streaming data and second interaction information transmitted by the second anchor terminal, target live-streaming data is acquired by fusing the first live-streaming data, the first interaction information, the second live-streaming data with the second interaction information; and then the target live-streaming data is sent to a terminal corresponding to the first audience account and a terminal corresponding to the second audience account. In this way, audiences can view the first interaction information posted by the first audience account and the second interaction information posted by the second audience account. Therefore, the interaction effect between audiences in different live-streaming rooms after the co-hosting is enhanced.

In some embodiments, in the above S220, said receiving the first live-streaming data, the first interaction information, the second live-streaming data and the second interaction information includes: receiving the first live-streaming data and the first interaction information over a first transmission line; and receiving the second live-streaming data and the second interaction information over a second transmission line. The server may determine the first transmission line corresponding to the first anchor terminal and the second transmission line corresponding to the second anchor terminal from the preset video stream transmission lines.

The preset video stream transmission line may be a plurality of video stream transmission lines, for example, a plurality of private UDP lines.

For example, the server determines the first anchor terminal and the second anchor terminal which currently establish the co-hosting, and determines two private UDP lines that are idle or currently have less transmission data from the preset private UDP lines, one is taken as the private UDP line corresponding to the first anchor terminal, i.e. the first transmission line, and another is taken as the private UDP line corresponding to the second anchor terminal, i.e. the second transmission line. The server establishes a long connection with the first anchor terminal over the private UDP line corresponding to the first anchor terminal. The first anchor terminal acquires the first live-streaming data from the first live-streaming room by compressing and encoding the acquired audio data and video data from the first live-streaming room and takes the acquired comment information posted by the first audience account in the first live-streaming room as the first interaction information. The first anchor terminal continuously sends the first live-streaming data and the first interaction information from the first live-streaming room to the server based on the long connection. Similarly, the server establishes a long connection with the second anchor terminal over the private UDP line corresponding to the second anchor terminal. The second anchor terminal acquires the second live-streaming data from the second live-streaming room by compressing and encoding the acquired audio data and video data from the second live-streaming room and takes the acquired comment information posted by the second audience account in the second live-streaming room as the second interaction information. The second anchor terminal continuously sends the second live-streaming data and the second interaction information from the second live-streaming room to the server based on the long connection.

In the technical solution according to an embodiment of the present disclosure, the live-streaming data and the interaction information from two live-streaming rooms are received over the preset video stream transmission lines, which is beneficial in reducing transmission delay of the live-streaming data and the interaction information from two live-streaming rooms, thereby reducing the delay of sending and displaying of synchronized live-streaming data and the interaction information to the audience terminal.

In some embodiments, in the above S230, said acquiring the target live-streaming data by fusing the first live-streaming data, the first interaction information, the second live-streaming data and the second interaction information includes: acquiring first audio and video data and second audio and video data by decoding the first live-streaming data and the second live-streaming data respectively; acquiring target audio and video data based on the first audio and video data and the second audio and video data; acquiring the target live-streaming data by fusing the target audio and video data, the first interaction information and the second interaction information. Wherein acquiring the target audio and video data based on the first audio and video data and the second audio and video data includes: acquiring fused audio and video data by fusing the first audio and video data with the second audio and video data; and acquiring the target audio and video data by encoding the fused audio and video data.

For example, the server acquires the first audio and video data from the first live-streaming room and the second audio and video data from the second live-streaming room by decoding the first live-streaming data from the first live-streaming room and the second live-streaming data from the second live-streaming room respectively based on decoding instructions; acquires mixed audio and video data by performing mixing, such as denoising, picture alignment (audio and video synchronization), and jittering and buffering for the first audio and video data from the first live-streaming room and the second audio and video data from the second live-streaming room; acquires target audio and video data by re-encoding the mixed audio and video data; and acquires the target live-streaming data by fusing the target audio and video data, the first interaction information and the second interaction information. The target audio and video data, the first interaction information and the second interaction information are fused to realize transferring the anchor account and the audience account in the first anchor terminal, and the anchor account and the audience account in the second anchor terminal into the same live-streaming room.

In the technical solution according to an embodiment of the present disclosure, the live-streaming data and the interaction information from two live-streaming rooms are mixed by the server with good processing performance to facilitate rapid synchronization of the acquired target live-streaming data and broadcast to the audience terminal subsequently, thereby avoiding and reducing the large delay of the live-streaming interaction video displayed on the audience terminal.

In some embodiments, in the above S240, said sending the target live-streaming data to the multiple audience terminals includes: sending the target live-streaming data to a content distribution network; superimposing, over the content distribution network, the target live-streaming data into original live-streaming data of the first anchor terminal and the second anchor terminal respectively; and sending the superimposed target live-streaming data to the multiple audience terminals.

In some embodiments, the server continuously uploads the target live-streaming data into a source station of the content distribution network, and superimposes the target live-streaming data on the original live-streaming data of the first anchor terminal and the second anchor terminal respectively over the content distribution network, such that the audience accounts of the first live-streaming room or the second live-streaming room can acquire the superimposed target live-streaming data, and thereby rapidly watch the live-streaming interaction video corresponding to the target live-streaming data. Therefore, the delayed broadcast of the live-streaming interaction video between two anchor terminals to the audience account logged in with the audience terminal is reduced.

For example, when the accounts of two anchor terminals trigger the co-hosting for PK, the server may send the target live-streaming data to the audience terminal corresponding to the first audience account and the audience terminal corresponding to the second audience account. In this way, the first audience account and the second audience account can view the co-hosting PK picture of the accounts of two anchor terminals in the current live-streaming room with rapid updated target live-streaming data.

In some embodiments, in the above S240, after sending the target live-streaming data to multiple audience terminals, the method further includes: receiving a live-streaming watching request from a target terminal, wherein the target terminal is a terminal corresponding to an audience account newly entering the first live-streaming room or the second live-streaming room; and sending the live-streaming watching request to the content distribution network, and sending the target live-streaming data to the target terminal over the content distribution network.

In some embodiments, after the content distribution network superimposes the target live-streaming data into the original live-streaming data of the first anchor terminal and the second anchor terminal respectively, when the audience account logged in with the target terminal wants to watch the live-streaming video of the first live-streaming room or the live-streaming video of the second live-streaming room, the target terminal may initiate a first live-streaming watching request for the first live-streaming room or a second live-streaming watching request for the second live-streaming room to the server, and the server sends the first live-streaming watching request or the second live-streaming watching request to the content distribution network. The content distribution network sends the target live-streaming data to the target terminal, and the target terminal displays the live-streaming interaction video corresponding to the target live-streaming data. The target live-streaming data sent by the content distribution network may be target live-streaming data after superimposition or target live-streaming data before superimposition.

In the technical solution according to an embodiment of the present disclosure, the target live-streaming data is superimposed into the original live-streaming data of the first anchor terminal and the second anchor terminal respectively over the content distribution network, such that the audience accounts subsequently entering the first live-streaming room or the second live-streaming room can rapidly watch the live-streaming interaction video corresponding to the target live-streaming data, thereby reducing the delay of the live-streaming interaction video that is between two anchor terminals and watched by the audience account logged in with the audience terminal.

In some embodiments, the first live-streaming data further carries first anchor information and first audience information of the first audience account in the first live-streaming room, and the second live-streaming data further carries second anchor information and second audience information of the second audience account in the second live-streaming room. The method according to the embodiments further includes: sending the first anchor information, the first audience information, the second anchor information and the second audience information to the multiple audience terminals in response to sending the target live-streaming data, and displaying the first anchor information, the first audience information, the first interaction information, the second anchor information, the second audience information and the second interaction information in response to the multiple audience terminals displaying a live-streaming interaction video corresponding to the target live-streaming data. The first anchor information is configured to identify the anchor account in the first live-streaming room, and may include anchor avatar, anchor account name, anchor account number, and the like, such as an avatar of an anchor A as shown in FIG. 3. The first audience information is configured to identify the first audience account in the first live-streaming room, and may include audience avatar, audience account name, audience account number, and the like, such as an audience avatar below the avatar of the anchor A as shown in FIG. 3.

The second anchor information is configured to identify the anchor account in the second live-streaming room, and may include anchor avatar, anchor account name, anchor account number, and the like, such as an avatar of an anchor B as shown in FIG. 3. The second audience information is configured to identify the second audience account in the second live-streaming room, and may include audience avatar, audience account name, audience account number, and the like, such as an audience avatar below the avatar of the anchor B as shown in FIG. 3.

In some embodiments, while receiving the first live-streaming data and the first interaction information from the first live-streaming room and the second live-streaming data and the second interaction information from the second live-streaming room, the server acquires the first anchor information and the first audience information corresponding to the first audience account in the first live-streaming room and the second anchor information and the second audience information corresponding to the second audience account in the second live-streaming room over the preset video stream transmission lines, and uploads the target live-streaming data, the first anchor information, the first audience information, the second anchor information and the second audience information into the source station of the content distribution network; the content distribution network sends the target live-streaming data, the first anchor information, the first audience information, the second anchor information and the second audience information to the audience terminal; the audience terminal displays the live-streaming interaction video corresponding to the target live-streaming data and displays the first anchor information, the first audience information and the first interaction information from the first live-streaming room and the second anchor information, the second audience information and the second interaction information from the second live-streaming room respectively on the terminal interface.

As shown in FIG. 3, the live-streaming interface includes left and right live-streaming interfaces, respectively carrying live-streaming images of anchor accounts logged in with the respective anchor terminals, the anchor information, the audience information and the audience comment information, and the like. That is, the left live-streaming interface carries live-streaming images of anchor A, the anchor information of anchor A, the audience information and the interaction information of audience A, audience B and audience C from the first live-streaming room; the right live-streaming interface carries live-streaming images of anchor B, the anchor information of anchor B, the audience information and the interaction information of audience D, audience E and audience F from the second live-streaming room. In this way, the audience accounts in two live-streaming rooms may view the anchor information and the audience information of both parties in the live-streaming room, and may also view the effect that the interaction information of audiences of both parties is scrolling from time to time, thereby improving the interaction.

In some embodiments, long connection communication may also be established between the first live-streaming room and the second live-streaming room. Based on the long connection communication, the server may continuously send the audience comment information from the first live-streaming room to the audience terminal corresponding to the audience account in the second live-streaming room, and continuously send the audience comment information from the second live-streaming room to the audience terminal corresponding to the audience account in the first live-streaming room. Therefore, while watching the live-streaming interaction video, the audience account in each live-streaming room may receive the real-time comment information posted by the audience account in the live-streaming room of the other party, thereby bringing the audience account an experience that the anchor account and the audience account of two live-streaming rooms are both in the same live-streaming room.

Figure 4:
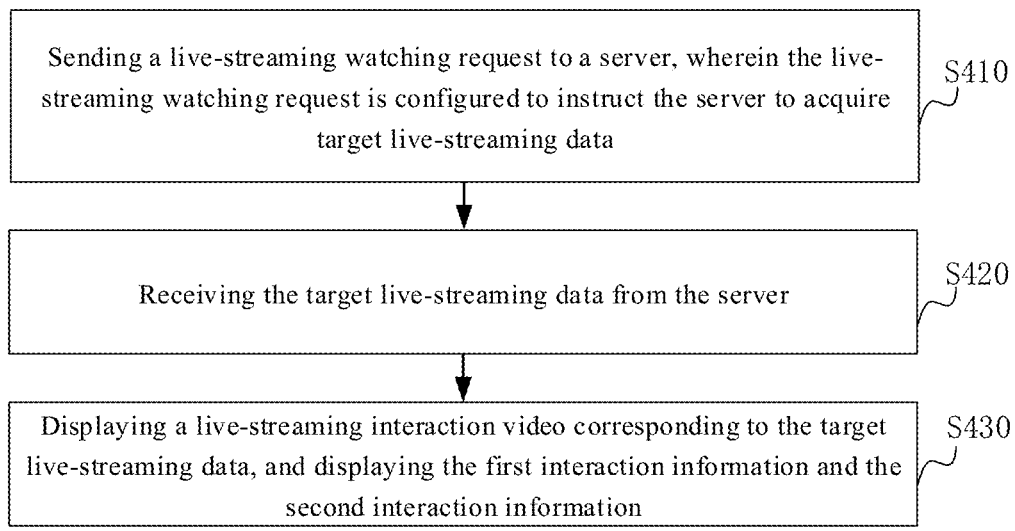
FIG. 4 is a flowchart of a method for processing a live-streaming interaction video according to another embodiment of the present disclosure.

FIG. 4 is a flowchart of a method for processing a live-streaming interaction video according to an embodiment of the present disclosure. As shown in FIG. 4, the method for processing the live-streaming interaction video is executable by the audience terminal shown in FIG. 1, and the method includes the following steps.

In S410, a live-streaming watching request is sent to a server, wherein the live-streaming watching request is configured to instruct the server to acquire target live-streaming data.

The target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account.

In S420, the target live-streaming data from the server is received.

In S430, a live-streaming interaction video corresponding to the target live-streaming data is displayed, and the first interaction information and the second interaction information are displayed.

For example, when the audience account logged in with the audience terminal wants to watch a live-streaming interaction video after co-hosting, the audience terminal may initiate a live-streaming watching request to the server, and the server transmits the live-streaming watching request to a content distribution network. In this way, the audience terminal can pull target live-streaming data from the content distribution network, displays the live-streaming interaction video corresponding to the target live-streaming data and display the first interaction information and the second interaction information.

In some embodiments, the first live-streaming data further carries first anchor information and first audience information of the first audience account in the first live-streaming room, and the second live-streaming data further carries second anchor information and second audience information of the second audience account in the second live-streaming room. Prior to displaying the live-streaming interaction video corresponding to the target live-streaming data, the above S430 further includes: receiving, from the server, the first anchor information and the first audience information from the first live-streaming room and the second anchor information and the second audience information from the second live-streaming room, when the live-streaming interaction video corresponding to the target live-streaming data is displayed, the first anchor information, the first audience information and the first interaction information from the first live-streaming room, and the second anchor information, the second audience information, and the second interaction information from the second live-streaming room are displayed.

In some embodiments, while receiving the target live-streaming data from the server, the audience terminal may also receive, from the server, the first anchor information and the first audience information from the first live-streaming room and the second anchor information and the second audience information from the second live-streaming room. Next, the audience terminal displays the live-streaming interaction video corresponding to the target live-streaming data and displays the first anchor information, the first audience information, and the first interaction information from the first live-streaming room and the second anchor information, the second audience information, and the second interaction information from the second live-streaming room on the terminal interface, as shown in FIG. 3.

While watching the live-streaming interaction video, the audience corresponding to the audience account may also view the anchor information of both parties and the audience information of both parties and perceive the first interaction information posted by the first audience account in the first live-streaming room and the second interaction information posted by the second audience account in the second live-streaming room in real time. That is, the audience accounts can watch the live-streaming interaction video of the two anchors, and can view the anchor information and the audience information of both parties in the live-streaming room, and further can view the effect that the comment information of audiences of both parties is scrolling from time to time, thereby bringing to the audience accounts the experience that both the anchor account and the audience account of the two live-streaming rooms are in the same live-streaming room, and thereby enhancing the interaction effect between audiences in different live-streaming rooms after the co-hosting.

In some embodiments, a method for processing a live-streaming interaction video is provided, the method is applicable to a server and includes: receiving a response message for an interaction connection request that is sent from a first anchor terminal to a second anchor terminal; receiving, based on the response message, first live-streaming video stream data and first interaction information from a first virtual space and second live-streaming video stream data and second interaction information from a second virtual space over preset video stream transmission lines, wherein the first live-streaming video stream data and the first interaction information are transmitted by the first anchor terminal, the second live-streaming video stream data and the second interaction information are transmitted by the second anchor terminal, the first interaction information is interaction information posted by a first audience account in the first virtual space, and the second interaction information is interaction information posted by a second audience account in the second virtual space; acquiring target live-streaming video stream data by fusing the first live-streaming video stream data and the first interaction information with the second live-streaming video stream data and the second interaction information; and synchronizing the target live-streaming video stream data to an audience terminal, wherein the audience terminal is a terminal corresponding to an audience account in the first virtual space or the second virtual space.

In some embodiments, said receiving the first live-streaming video stream data and the first interaction information, and the second live-streaming video stream data and the second interaction information over the preset video stream transmission lines includes: determining, based on the response message, a video stream transmission line corresponding to the first anchor terminal and a video stream transmission line corresponding to the second anchor terminal from the preset video stream transmission lines; and receiving the first live-streaming video stream data and the first interaction information over the video stream transmission line corresponding to the first anchor terminal and receiving the second live-streaming video stream data and the second interaction information over the video stream transmission line corresponding to the second anchor terminal.

In some embodiments, said acquiring the target live-streaming video stream data by fusing the first live-streaming video stream data and the first interaction information with the second live-streaming video stream data and the second interaction information includes: acquiring first audio and video data and second audio and video data by decoding the first live-streaming video stream data and the second live-streaming video stream data respectively; acquiring fused audio and video data by fusing the first audio and video data with the second audio and video data; encoding the fused audio and video data; and acquiring the target live-streaming video stream data by fusing encoded audio and video data with the first interaction information and the second interaction information.

In some embodiments, said synchronizing the target live-streaming video stream data to the audience terminal includes: sending the target live-streaming video stream data to a content distribution network, superimposing, over the content distribution network, the target live-streaming video stream data into original live-streaming video stream data of the first anchor terminal and the second anchor terminal respectively, and sending the superimposed target live-streaming video stream data to the audience terminal for display.

In some embodiments, in response to synchronizing the target live-streaming video stream data to the audience terminal, the method further includes: receiving a live-streaming watching request from a target terminal, wherein the target terminal is a terminal corresponding to an audience account newly entering the first virtual space or the second virtual space; and sending, over the content distribution network, the target live-streaming video stream data to the target terminal based on the live-streaming watching request.

In some embodiments, the first live-streaming video stream data further carries first anchor account information and first audience account information of the first audience account in the first virtual space, and the second live-streaming video stream data further carries second anchor account information and second audience account information of the second audience account in the second virtual space; and said synchronizing the target live-streaming video stream data to the audience terminal further includes: synchronizing the target live-streaming video stream data, the first anchor account information, the first audience account information, the second anchor account information and the second audience account information to the audience terminal, wherein the audience terminal is configured to display a live-streaming interaction video corresponding to the target live-streaming video stream data and display the first anchor account information, the first audience account information and the first interaction information from the first virtual space and the second anchor account information, the second audience account information and the second interaction information from the second virtual space respectively.

In some embodiments, a method for processing a live-streaming interaction video is provided, the method is applicable to an audience terminal and includes: sending, by a first anchor terminal, a live-streaming watching request to a server in response to an interaction connection request initiated by a second anchor terminal, such that the server acquires fused target live-streaming video stream data based on the live-streaming watching request, wherein the target live-streaming video stream data is acquired by fusing first live-streaming video stream data and first interaction information from a first virtual space with second live-streaming video stream data and second interaction information from a second virtual space, wherein the first live-streaming video stream data and the first interaction information are transmitted by the first anchor terminal over a preset video stream transmission line, the second live-streaming video stream data and the second interaction information are transmitted by the second anchor terminal over another preset video stream transmission line, the first interaction information is interaction information posted by a first audience account in the first virtual space, the second interaction information is interaction information posted by a second audience account in the second virtual space, and the audience terminal is a terminal corresponding to an audience account in the first virtual space or the second virtual space; receiving the target live-streaming video stream data from the server; and displaying a live-streaming interaction video corresponding to the target live-streaming video stream data, and displaying the first interaction information and the second interaction information respectively.

In some embodiments, the first live-streaming video stream data further carries first anchor account information and first audience account information of the first audience account in the first virtual space, and the second live-streaming video stream data further carries second anchor account information and second audience account information of the second audience account in the second virtual space; prior to displaying the live-streaming interaction video corresponding to the target live-streaming video stream data, the method further includes: receiving, from the server, the first anchor account information and the first audience account information from the first virtual space and the second anchor account information and the second audience account information from the second virtual space; and said displaying the live-streaming interaction video corresponding to the target live-streaming video stream data, and displaying the first interaction information and the second interaction information respectively includes: displaying the live-streaming interaction video corresponding to the target live-streaming video stream data, and displaying the first anchor account information, the first audience account information, and the first interaction information from the first virtual space, and the second anchor account information, the second audience account information, and the second interaction information from the second virtual space respectively.

Figure 5:
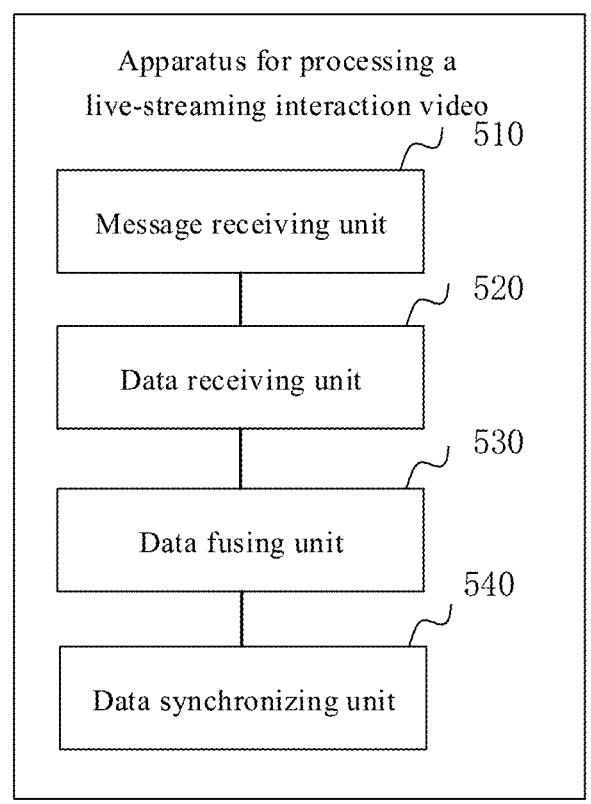
FIG. 5 is a block diagram of an apparatus for processing a live-streaming interaction video according to an embodiment of the present disclosure.

FIG. 5 is a block diagram of an apparatus for processing a live-streaming interaction video according to an embodiment of the present disclosure. As shown in FIG. 5, the apparatus includes a message receiving unit 510, a data receiving unit 520, a data fusing unit 530 and a data synchronizing unit 540.

The message receiving unit 510 is configured to receive a response message for an interaction connection request that is sent from a first anchor terminal to a second anchor terminal.

The data receiving unit 520 is configured to receive, based on the response message, first live-streaming video stream data and first interaction information from a first virtual space and second live-streaming video stream data and second interaction information from a second virtual space over preset video stream transmission lines, wherein the first live-streaming video stream data and the first interaction information are transmitted by the first anchor terminal, the second live-streaming video stream data and the second interaction information are transmitted by the second anchor terminal, the first interaction information is interaction information posted by a first audience account in the first virtual space, and the second interaction information is interaction information posted by a second audience account in the second virtual space.

The data fusing unit 530 is configured to acquire target live-streaming video stream data by fusing the first live-streaming video stream data and the first interaction information with the second live-streaming video stream data and the second interaction information.

The data synchronizing unit 540 is configured to synchronize the target live-streaming video stream data to an audience terminal, wherein the audience terminal is a terminal corresponding to an audience account in the first virtual space or the second virtual space.

In some embodiments, the data receiving unit 520 is further configured to determine, based on the response message, a video stream transmission line corresponding to the first anchor terminal and a video stream transmission line corresponding to the second anchor terminal from the preset video stream transmission lines; and receive the first live-streaming video stream data and the first interaction information over the video stream transmission line corresponding to the first anchor terminal and receive the second live-streaming video stream data and the second interaction information over the video stream transmission line corresponding to the second anchor terminal.

In some embodiments, the data fusing unit 530 is further configured to acquire first audio and video data and second audio and video data by decoding the first live-streaming video stream data and the second live-streaming video stream data respectively; acquire fused audio and video data by fusing the first audio and video data with the second audio and video data; encode the fused audio and video data; and acquire the target live-streaming video stream data by fusing encoded audio and video data with the first interaction information and the second interaction information.

In some embodiments, the data synchronizing unit 540 is further configured to send the target live-streaming video stream data to a content distribution network; superimpose, over the content distribution network, the target live-streaming video stream data into original live-streaming video stream data from the first anchor terminal and the second anchor terminal respectively, and send the superimposed target live-streaming video stream data to the audience terminal for display.

In some embodiments, the apparatus for processing the live-streaming interaction video further includes a data sending unit configured to receive a live-streaming watching request from a target terminal, wherein the target terminal is a terminal corresponding to an audience account newly entering the first virtual space or the second virtual space; and send, over the content distribution network, the target live-streaming video stream data to the target terminal based on the live-streaming watching request.

In some embodiments, the first live-streaming video stream data further carries first anchor account information and first audience account information of the first audience account in the first virtual space, and the second live-streaming video stream data further carries second anchor account information and second audience account information of the second audience account in the second virtual space.

The data synchronizing unit 540 is further configured to synchronize the target live-streaming video stream data, the first anchor account information, the first audience account information, the second anchor account information and the second audience account information to the audience terminal; wherein the audience terminal is configured to display a live-streaming interaction video corresponding to the target live-streaming video stream data and display the first anchor account information, the first audience account information and the first interaction information from the first virtual space and the second anchor account information, the second audience account information and the second interaction information from the second virtual space respectively.

Specific fashions in which various modules of the apparatus in the above embodiment perform operations are already described in detail in the method embodiments, and thus are not described in detail herein.

Figure 6:
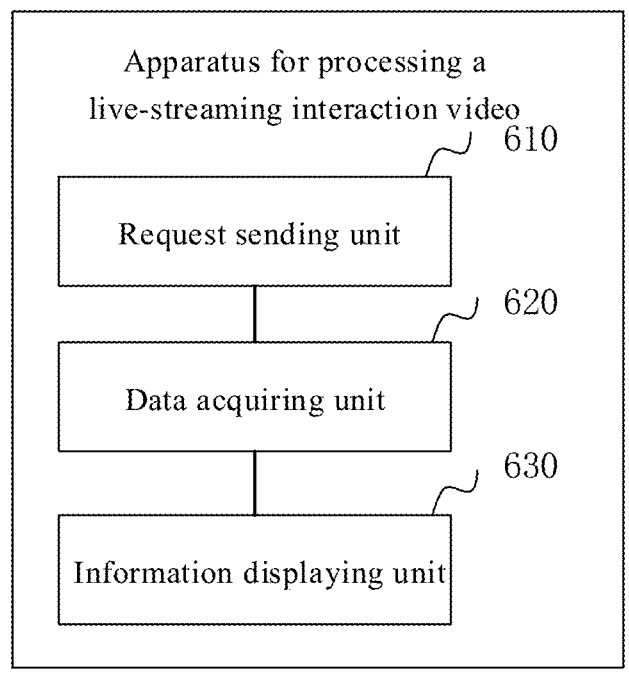
FIG. 6 is a block diagram of an apparatus for processing a live-streaming interaction video according to another embodiment of the present disclosure.

FIG. 6 is a block diagram of another apparatus for processing a live-streaming interaction video according to an embodiment of the present disclosure. As shown in FIG. 6, the apparatus includes a request sending unit 610, a data acquiring unit 620 and an information displaying unit 630.

The request sending unit 610 is configured to send, by a first anchor terminal, a live-streaming watching request to a server in response to an interaction connection request initiated by a second anchor terminal, such that the server acquires fused target live-streaming video stream data based on the live-streaming watching request, wherein the target live-streaming video stream data is acquired by fusing first live-streaming video stream data and first interaction information from a first virtual space with second live-streaming video stream data and second interaction information from a second virtual space, wherein the first live-streaming video stream data and the first interaction information are transmitted by the first anchor terminal over preset video stream transmission lines, the second live-streaming video stream data and the second interaction information are transmitted by the second anchor terminal over the preset video stream transmission lines, the first interaction information is interaction information posted by a first audience account in the first virtual space, the second interaction information is interaction information posted by a second audience account in the second virtual space, and the audience terminal is a terminal corresponding to an audience account in the first virtual space or the second virtual space.

The data acquiring unit 620 is configured to receive the target live-streaming video stream data from the server.

The information displaying unit 630 is configured to display a live-streaming interaction video corresponding to the target live-streaming video stream data, and display the first interaction information and the second interaction information respectively.

In some embodiments, the first live-streaming video further carries first anchor account information and first audience account information of the first audience account in the first virtual space, and the second live-streaming video stream data also carries second anchor account information and second audience account information of the second audience account in the second virtual space.

The apparatus for processing the live-streaming interaction video according to the present disclosure further includes an information receiving unit configured to receive, from the server, the first anchor account information and the first audience information from the first virtual space and the second anchor account information and the second audience account information from the second virtual space.

The information displaying unit 630 is further configured to display the live-streaming interaction video corresponding to the target live-streaming video stream data, and display the first anchor account information, the first audience account information, and the first interaction information from the first virtual space, and the second anchor account information, the second audience account information and the second interaction information from the second virtual space respectively.

Specific fashions in which various modules of the apparatus in the above embodiment perform operations are already described in detail in the method embodiments, and thus are not described in detail herein.

Figure 7:
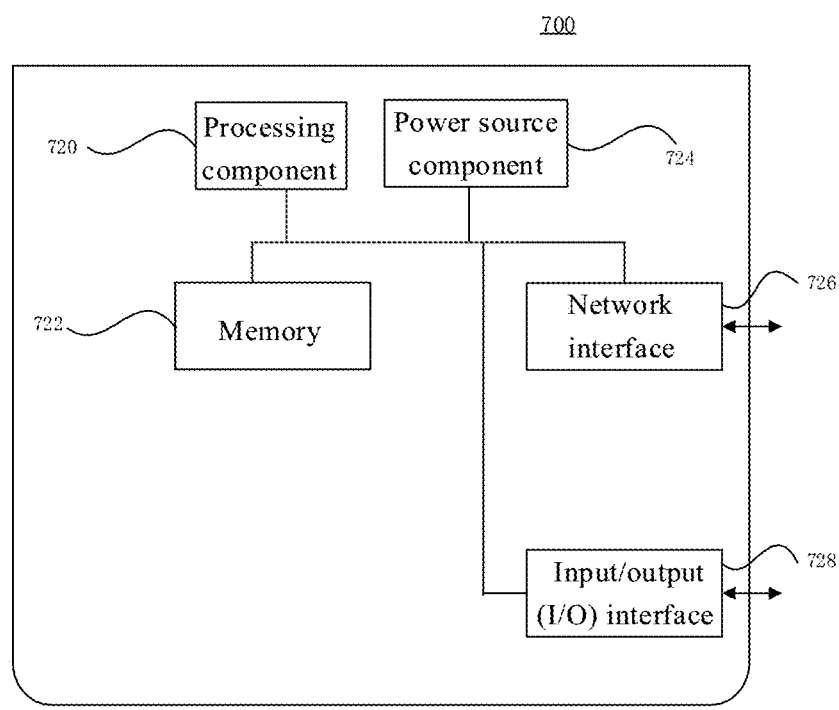
FIG. 7 is a schematic diagram of an internal structure of a server according to an embodiment of the present disclosure.

FIG. 7 is a block diagram of a device 700 for performing the above method for processing a live-streaming interaction video according to an embodiment of the present disclosure. For example, the device 700 may be a server. As shown in FIG. 7, the device 700 includes a processing component 720 that further includes one or more processors, and a memory resource represented by a memory 722 for storing at least one instruction executable by the processing component 720, for example, an application program. The application program stored in the memory 722 may include one or more modules, each of which corresponds to a set of instructions. In addition, the processing component 720, when executing the at least one instruction, is caused to perform: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room, and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

In some embodiments, the processing component, when executing the at least one instruction, is caused to perform: acquiring first audio and video data and second audio and video data by decoding the first live-streaming data and the second live-streaming data respectively; acquiring target audio and video data based on the first audio and video data and the second audio and video data; and acquiring the target live-streaming data by fusing the target audio and video data, the first interaction information with the second interaction information.

In some embodiments, the processing component, when executing the at least one instruction, is caused to perform: acquiring fused audio and video data by fusing the first audio and video data with the second audio and video data; and acquiring the target audio and video data by encoding the fused audio and video data.

In some embodiments, the processing component, when executing the at least one instruction, is caused to perform: sending the target live-streaming data to a content distribution network; superimposing, over the content distribution network, the target live-streaming data into original live-streaming data of the first anchor terminal and the second anchor terminal respectively; and sending the superimposed target live-streaming data to the multiple audience terminals.

In some embodiments, the processing component, when executing the at least one instruction, is caused to perform: receiving a live-streaming watching request from a target terminal, wherein the target terminal is a terminal corresponding to an audience account newly entering the first live-streaming room or the second live-streaming room; and sending the live-streaming watching request to the content distribution network, and sending the target live-streaming data to the target terminal over the content distribution network.

In some embodiments, the processing component, when executing the at least one instruction, is caused to perform: receiving the first live-streaming data and the first interaction information over a first transmission line; and receiving the second live-streaming data and the second interaction information over a second transmission line.

In some embodiments, the first live-streaming data further carries first anchor information and first audience information of the first audience account in the first live-streaming room, and the second live-streaming data further carries second anchor information and second audience information of the second audience account in the second live-streaming room; the processing component, when executing the at least one instruction, is caused to perform: sending the first anchor information, the first audience information, the second anchor information and the second audience information to the multiple audience terminals, and displaying the first anchor information, the first audience information, the first interaction information, the second anchor information, the second audience information and the second interaction information in response to the multiple audience terminals displaying a live-streaming interaction video corresponding to the target live-streaming data.

The device 700 may further include a power source component 724 configured to perform power source management of the device 700, a wired or wireless network interface 726 configured to connect the device 700 to a network, and an input/output (I/O) interface 728. The device 700 may operate an operating system stored in the memory 722, such as Windows Server™, Mac OS X™, Unix™, Linux™, FreeBSD™, or the like.

An exemplary embodiment of the present disclosure further provides a storage medium including instructions, for example, a memory 722 including instructions. The above instructions may be executed by a processor of a device 700 to complete the above method for processing the live-streaming interaction video. The storage medium may be a non-transitory computer-readable storage medium, such as a read-only memory (ROM), a random access memory (RAM), CD-ROM, a magnetic tape, a floppy disk and an optical data storage device.

Figure 8:
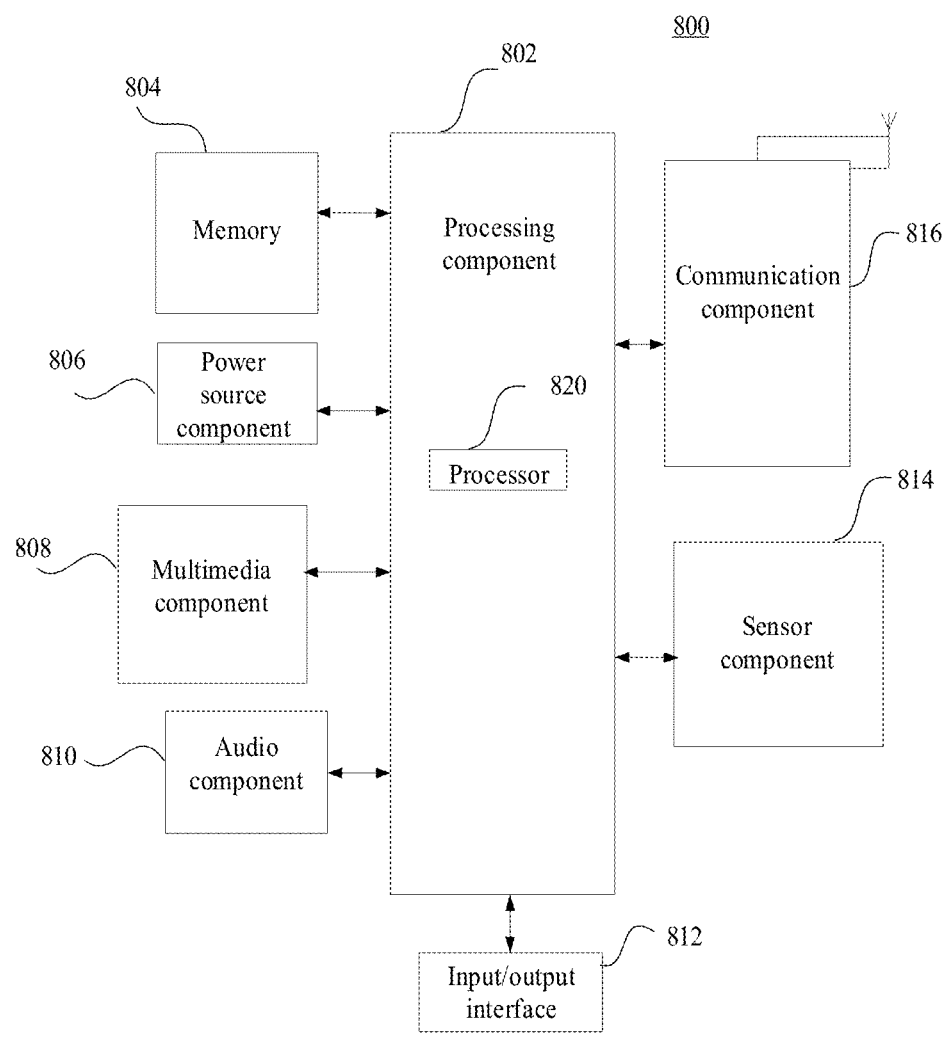
FIG. 8 is a schematic diagram of an internal structure of an electronic device according to an embodiment of the present disclosure.

FIG. 8 is a block diagram of a device 800 for performing the above method for processing the live-streaming interaction video according to an embodiment of the present disclosure. For example, the device 800 may be a mobile phone, a computer, a digital broadcast terminal, a message transceiver device, a game console, a tablet device, a medical device, a fitness device, a personal digital assistant, or the like.

As shown in FIG. 8, the device 800 may include one or more of the following components: a processing component 802, a memory 804, a power source component 806, a multimedia component 808, an audio component 810, an input/output (I/O) interface 812, a sensor component 814 and a communication component 816.

The processing component 802 generally controls overall operations of the device 800, such as the operations associated with display, phone call, data communication, camera operation, and recording operation. The processing component 802 may include one or more processors 820 to execute instructions so as to complete all or a part of steps in the above method. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data so as to support the operation of the device 800. Examples of such data include instructions, contact data, phonebook data, messages, pictures, videos, and so on for any application program or method operated on the device 800. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power source component 806 provides power to various components of the device 800. The power source component 806 may include a power management system, one or more power sources, and any other components associated with the generation, management, and distribution of power in the device 800.

The multimedia component 808 includes a screen providing an output interface between the device 800 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focal length and optical zooming capability.

The audio component 810 is configured to output and/or input audio signals. For example, the audio component 810 includes a microphone (MIC) configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker configured to output an audio signal.

The I/O interface 812 provides an interface between the processing component 802 and a peripheral interface module. The above peripheral interface module may be a keyboard, a click wheel, buttons, or the like. These buttons may include, but are not limited to, a home button, a volume button, a start button, and a lock button.

The sensor component 814 includes one or more sensors configured to provide status assessments of various aspects of the device 800. For example, the sensor component 814 may detect an open/closed status of the device 800, relative positioning of components, e.g., a display and a keypad of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may further include an optical sensor, such as a complementary metal-oxide-semiconductor (CMOS) or charged coupled device (CCD) image sensor for use in imaging applications. In some embodiments, the sensor component 814 may further include an accelerometer sensor, a gyroscope sensor, a magnetic sensor, a pressure sensor, or a temperature sensor.

The communication component 816 is configured to facilitate wired or wireless communication between the device 800 and other devices. The device 800 may access a wireless network based on a communication standard, such as WiFi, a network of an operator (such as 2G, 3G, 4G or 5G), or a combination thereof. In an exemplary embodiment, the communication component 816 receives a broadcast signal or broadcast related information from an external broadcast management system via a broadcast channel. In an exemplary embodiment, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device 800 may be implemented by one or more application specific integrated circuits (ASIC), digital signal processors (DSP), digital signal processing devices (DSPD), programmable logic devices (PLD), field-programmable gate array (FPGA), controllers, microcontrollers, microprocessors or other electronic elements to perform: sending a live-streaming watching request to a server, wherein the live-streaming watching request is configured to instruct the server to acquire target live-streaming data, wherein the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

In some embodiments, the first live-streaming data further carries first anchor information and first audience information of the first audience account in the first live-streaming room, and the second live-streaming data further carries second anchor information and second audience information of the second audience account in the second live-streaming room; and the device further performs: receiving and displaying the first anchor information, the first audience information, the second anchor information and the second audience information sent by the server.

An exemplary embodiment of the present disclosure further provides a non-transitory computer-readable storage medium including instructions, for example, a memory 804 including the instructions. The above instructions are executable by a processor 820 of a device 800 to perform: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room, and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

For example, the non-transitory computer-readable storage medium may be a read-only memory (ROM), a random access memory (RAM), a compact disc read-only memory (CD-ROM), a magnetic tape, a floppy disk, an optical data storage device, or the like.

An exemplary embodiment of the present disclosure further provides a non-transitory computer-readable storage medium including instructions, for example, a memory 804 including the instructions. The above instructions are executable by a processor 820 of a device 800 to perform: sending a live-streaming watching request to a server, wherein the live-streaming watching request is configured to instruct the server to acquire target live-streaming data, wherein the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

In some embodiments, the first live-streaming data further carries first anchor information and first audience information of the first audience account in the first live-streaming room, and the second live-streaming data further carries second anchor information and second audience information of the second audience account in the second live-streaming room; and the device further perform: receiving and displaying the first anchor information, the first audience information, the second anchor information and the second audience information sent by the server.

For example, the non-transitory computer-readable storage medium may be a read-only memory (ROM), a random access memory (RAM), a compact disc read-only memory (CD-ROM), a magnetic tape, a floppy disk, an optical data storage device, or the like.

An exemplary embodiment of the present disclosure further provides a computer program product including at least one computer programs, and the at least one computer program is stored in a readable storage medium. The at least one computer program, when read and executed by at least one processor of a device, causes the device to perform: sending a data transmission request to a first anchor terminal and a second anchor terminal in response to a response message from the first anchor terminal, wherein the response message is intended to response to an interaction connection request that is sent from the second anchor terminal; receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room, and the second interaction information is interaction information posted by a second audience account in the second live-streaming room; acquiring target live-streaming data by fusing the first live-streaming data, the first interaction information, the second live-streaming data with the second interaction information; and sending the target live-streaming data to multiple audience terminals, wherein the multiple audience terminals include a terminal corresponding to the first audience account and a terminal corresponding to the second audience account.

In some embodiments, the at least one computer program, when read and executed by at least one processor of the device, causes the device to perform: acquiring first audio and video data and second audio and video data by decoding the first live-streaming data and the second live-streaming data respectively; acquiring target audio and video data based on the first audio and video data and the second audio and video data; acquiring the target live-streaming data by fusing the target audio and video data, the first interaction information with the second interaction information.

In some embodiments, the at least one computer program, when read and executed by at least one processor of the device, causes the device to perform: acquiring fused audio and video data by fusing the first audio and video data with the second audio and video data; and acquiring the target audio and video data by encoding the fused audio and video data.

In some embodiments, the at least one computer program, when read and executed by at least one processor of the device, causes the device to perform: sending the target live-streaming data to a content distribution network; superimposing, over the content distribution network, the target live-streaming data into original live-streaming data of the first anchor terminal and the second anchor terminal respectively; and sending the superimposed target live-streaming data to the multiple audience terminals.

In some embodiments, the at least one computer program, when read and executed by at least one processor of the device, causes the device to perform: receiving a live-streaming watching request from a target terminal, wherein the target terminal is a terminal corresponding to an audience account newly entering the first live-streaming room or the second live-streaming room; and sending the live-streaming watching request to the content distribution network, and sending the target live-streaming data to the target terminal over the content distribution network.

In some embodiments, the at least one computer program, when read and executed by at least one processor of the device, causes the device to perform: receiving the first live-streaming data and the first interaction information over a first transmission line; and receiving the second live-streaming data and the second interaction information over a second transmission line.

In some embodiments, the first live-streaming data further carries first anchor information and first audience information of the first audience account in the first live-streaming room, and the second live-streaming data further carries second anchor information and second audience information of the second audience account in the second live-streaming room; the at least one computer program, when read and executed by at least one processor of the device, causes the device to perform: sending the first anchor information, the first audience information, the second anchor information and the second audience information to the multiple audience terminals, and displaying the first anchor information, the first audience information, the first interaction information, the second anchor information, the second audience information and the second interaction information in response to the multiple audience terminals displaying a live-streaming interaction video corresponding to the target live-streaming data.

An exemplary embodiment of the present disclosure further provides a computer program product including at least one computer programs, and the at least one computer program is stored in a readable storage medium. The at least one computer program, when read and executed by at least one processor of a device, causes the device to perform: sending a live-streaming watching request to a server, wherein the live-streaming watching request is configured to instruct the server to acquire target live-streaming data, wherein the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account; receiving the target live-streaming data from the server; and displaying a live-streaming interaction video corresponding to the target live-streaming data, and displaying the first interaction information and the second interaction information.

In some embodiments, the first live-streaming data further carries first anchor information and first audience information of the first audience account in the first live-streaming room, and the second live-streaming data further carries second anchor information and second audience information of the second audience account in the second live-streaming room; the at least one computer program, when read and executed by at least one processor of the device, causes the device to perform: receiving and displaying the first anchor information, the first audience information, the second anchor information and the second audience information sent by the server.

All the embodiments of the present disclosure can be executed individually or in combination with other embodiments, and they are all regarded as the scope of protection required by the present disclosure.

What is claimed is:

1. A method for processing a live-streaming interaction video, executable by a server, the method comprising:

sending a data transmission request to a first anchor terminal and a second anchor terminal in response to a response message from the first anchor terminal, wherein the response message is intended to response to an interaction connection request that is sent from the second anchor terminal;

receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room, and the second interaction information is interaction information posted by a second audience account in the second live-streaming room;

fusing the first live-streaming data, the first interaction information, the second live-streaming data with the second interaction information to acquire target live-streaming data; and sending the target live-streaming data to multiple audience terminals for display, wherein the multiple audience terminals comprise a terminal corresponding to the first audience account and a terminal corresponding to the second audience account;

wherein a live-streaming interface displayed on the multiple audience terminals includes a first live-streaming room interface and a second live-streaming room interface, the first live-streaming room interface displays the first live-streaming data and the first interaction information, and the second live-streaming room interface displays the second live-streaming data and the second interaction information; and wherein said receiving the first live-streaming data, the first interaction information, the second live-streaming data and the second interaction information comprises:

establishing a long connection with the first anchor terminal over a first transmission line, and receiving the first live-streaming data and the first interaction information from the first anchor terminal over the first transmission line, wherein the first transmission line is a first preset video stream transmission line dedicated to video stream transmission and is a private user datagram protocol (UDP) line corresponding to the first anchor terminal; and establishing a long connection with the second anchor terminal over a second transmission line, and receiving the second live-streaming data and the second interaction information from the second anchor terminal over the second transmission line, wherein the second transmission line is a second preset video stream transmission line dedicated to video stream transmission and is a private UDP line corresponding to the second anchor terminal.

2. The method according to claim 1, wherein said fusing the first live-streaming data, the first interaction information, the second live-streaming data with the second interaction information to acquire target live-streaming data comprises:

acquiring first audio and video data and second audio and video data by decoding the first live-streaming data and the second live-streaming data, respectively;

acquiring target audio and video data based on the first audio and video data and the second audio and video data; and fusing the target audio and video data, the first interaction information, and the second interaction information to acquire the target live-streaming data.

3. The method according to claim 2, said acquiring the target audio and video data based on the first audio and video data and the second audio and video data comprises:

acquiring fused audio and video data by fusing the first audio and video data with the second audio and video data; and acquiring the target audio and video data by encoding the fused audio and video data.

4. The method according to claim 1, wherein said sending the target live-streaming data to the multiple audience terminals comprises:

sending the target live-streaming data to a content distribution network;

superimposing, over the content distribution network, the target live-streaming data into original live-streaming data of the first anchor terminal and the second anchor terminal respectively; and sending the superimposed target live-streaming data to the multiple audience terminals.

5. The method according to claim 4, further comprising:

receiving a live-streaming watching request from a target terminal, wherein the target terminal is a terminal corresponding to an audience account newly entering the first live-streaming room or the second live-streaming room; and sending the live-streaming watching request to the content distribution network, and sending the target live-streaming data to the target terminal over the content distribution network.

6. The method according to claim 1, wherein the first live-streaming data further carries first anchor information and first audience information of the first audience account in the first live-streaming room, and the second live-streaming data further carries second anchor information and second audience information of the second audience account in the second live-streaming room; and the method further comprises:

sending the first anchor information, the first audience information, the second anchor information and the second audience information to the multiple audience terminals, and displaying the first anchor information, the first audience information, the first interaction information, the second anchor information, the second audience information and the second interaction information in response to the multiple audience terminals displaying a live-streaming interaction video corresponding to the target live-streaming data.

7. A method for processing a live-streaming interaction video, executable by an audience terminal, the method comprising:

sending a live-streaming watching request to a server, wherein the live-streaming watching request is configured to instruct the server to acquire target live-streaming data, wherein the target live-streaming data is acquired by fusing first live-streaming data, first interaction information, second live-streaming data with second interaction information by the server, wherein the first live-streaming data is live-streaming data corresponding to a first anchor terminal during live-streaming in a first live-streaming room, the first interaction information is interaction information posted by a first audience account in the first live-streaming room, the second live-streaming data is live-streaming data corresponding to a second anchor terminal during live-streaming in a second live-streaming room, the second interaction information is interaction information posted by a second audience account in the second live-streaming room, and the audience terminal is a terminal corresponding to the first audience account or the second audience account;

receiving the target live-streaming data from the server; and displaying, on a live-streaming interface, a live-streaming interaction video corresponding to the target live-streaming data, and displaying the first interaction information and the second interaction information;

wherein the live-streaming interface includes a first live-streaming room interface and a second live-streaming room interface, the first live-streaming room interface displays the first live-streaming data including the first interaction information, and the second live-streaming room interface displays the second live-streaming data including the second interaction information; and wherein the first live-streaming data and the first interaction information are received over a first transmission line, wherein the first transmission line is a first preset video stream transmission line dedicated to video stream transmission and is a private user datagram protocol (UDP) line corresponding to the first anchor terminal; and wherein the second live-streaming data and the second interaction information are received over a second transmission line, the second transmission line is a second preset video stream transmission line dedicated to video stream transmission and is a private UDP line corresponding to the second anchor terminal.

8. The method according to claim 7, wherein the first live-streaming data further carries first anchor information and first audience information of the first audience account in the first live-streaming room, and the second live-streaming data further carries second anchor information and second audience information of the second audience account in the second live-streaming room;

the method further comprises:

receiving and displaying the first anchor information, the first audience information, the second anchor information and the second audience information sent by the server.

9. A server, comprising:

a processor; and a memory configured to store at least one instruction executable by the processor, wherein the processor, when loading and executing, is caused to perform:

sending a data transmission request to a first anchor terminal and a second anchor terminal in response to a response message from the first anchor terminal, wherein the response message is intended to response to an interaction connection request that is sent from the second anchor terminal;

receiving first live-streaming data, first interaction information, second live-streaming data and second interaction information, wherein the first live-streaming data is live-streaming data corresponding to the first anchor terminal during live-streaming in a first live-streaming room, the first interaction information is interaction information posted by a first audience account in the first live-streaming room, the second live-streaming data is live-streaming data corresponding to the second anchor terminal during live-streaming in a second live-streaming room and the second interaction information is interaction information posted by a second audience account in the second live-streaming room;

fusing the first live-streaming data, the first interaction information, the second live-streaming data with the second interaction information to acquire target live-streaming data; and sending the target live-streaming data to multiple audience terminals for display, wherein the multiple audience terminals comprise a terminal corresponding to the first audience account and a terminal corresponding to the second audience account;

wherein a live-streaming interface displayed on the multiple audience terminals includes a first live-streaming room interface and a second live-streaming room interface, the first live-streaming room interface displays the first live-streaming data and the first interaction information, and the second live-streaming room interface displays the second live-streaming data and the second interaction information wherein the processor, when loading and executing the at least one instruction, is caused to perform:

establishing a long connection with the first anchor terminal over a first transmission line, and receiving the first live-streaming data and the first interaction information from the first anchor terminal over the first transmission line, wherein the first transmission line is a first preset video stream transmission line dedicated to video stream transmission and is a private user datagram protocol (UDP) line corresponding to the first anchor terminal; and establishing a long connection with the second anchor terminal over a second transmission line, and receiving the second live-streaming data and the second interaction information from the second anchor terminal over the second transmission line, wherein the second transmission line is a second preset video stream transmission line dedicated to video stream transmission and is a private UDP line corresponding to the second anchor terminal.

10. The server according to claim 9, wherein the processor, when loading and executing the at least one instruction, is caused to perform:

acquiring first audio and video data and second audio and video data by decoding the first live-streaming data and the second live-streaming data respectively;

acquiring target audio and video data based on the first audio and video data and the second audio and video data; and fusing the target audio and video data, the first interaction information with the second interaction information to acquire the target live-streaming data.

11. The server according to claim 10, wherein the processor, when loading and executing the at least one instruction, is caused to perform:

acquiring fused audio and video data by fusing the first audio and video data with the second audio and video data; and acquiring the target audio and video data by encoding the fused audio and video data.

12. The server according to claim 9, wherein the processor, when loading and executing the at least one instruction, is caused to perform:

sending the target live-streaming data to a content distribution network;

superimposing, over the content distribution network, the target live-streaming data into original live-streaming data of the first anchor terminal and the second anchor terminal respectively; and sending the superimposed target live-streaming data to the multiple audience terminals.

13. The server according to claim 12, wherein the processor, when loading and executing the at least one instruction, is caused to perform:

receiving a live-streaming watching request from a target terminal, wherein the target terminal is a terminal corresponding to an audience account newly entering the first live-streaming room or the second live-streaming room; and sending the live-streaming watching request to the content distribution network, and sending the target live-streaming data to the target terminal over the content distribution network.

14. The server according to claim 9, wherein the first live-streaming data further carries first anchor information and first audience information of the first audience account in the first live-streaming room, and the second live-streaming data further carries second anchor information and second audience information of the second audience account in the second live-streaming room; and the processor, when loading and executing the at least one instruction, is caused to perform:

sending the first anchor information, the first audience information, the second anchor information and the second audience information to the multiple audience terminals, and displaying the first anchor information, the first audience information, the first interaction information, the second anchor information, the second audience information and the second interaction information in response to the multiple audience terminals displaying a live-streaming interaction video corresponding to the target live-streaming data.

* * * * *